United States Patent [19]
Lieber et al.
[11] 4,220,975
[45] Sep. 2, 1980

[54] PROXIMITY FOCUSED SHUTTER TUBE AND CAMERA

[75] Inventors: Albert J. Lieber; Howard D. Sutphin, both of Los Alamos, N. Mex.
[73] Assignee: General Engineering & Applied Research Inc., Los Alamos, N. Mex.

[21] Appl. No.: 931,730
[22] Filed: Aug. 7, 1978
[51] Int. Cl.[2] .............. H04N 5/30
[52] U.S. Cl. .............. 358/209; 313/105 CM
[58] Field of Search .............. 354/227, 234, 248; 358/209; 313/105 CM, 95

[56] References Cited

U.S. PATENT DOCUMENTS

| | | | |
|---|---|---|---|
| 3,603,828 | 9/1971 | Sheldon | 313/65 |
| 3,761,614 | 9/1973 | Bradley | 356/226 |
| 3,777,201 | 12/1973 | Einstein | 313/65 |
| 4,095,136 | 6/1978 | Niklas | 313/105 CM |

*Primary Examiner*—Richard Murray
*Attorney, Agent, or Firm*—Flehr, Hohbach, Test

[57] ABSTRACT

A shutter for a proximity focused tube and camera comprising an array of stacked microchannel plates. An electrode is provided between each plate whereby an electrical field can be established across each plate. By applying a ramp voltage to alternate plates in the stacked array, the electric field across each plate deflects a photoelectron beam and allows a momentary period of transmission of the beam through the microchannels. The electrode on each plate is skewed with respect to the front and back faces of the plate whereby in-phase deflection of an electron beam is achieved. A plurality of proximity focused shutter tubes can be operated in an array and triggered from a common voltage pulse source whereby a pulse is applied in a time ordered sequence to develop related multiple frames.

15 Claims, 5 Drawing Figures

PROXIMITY FOCUSED SHUTTER TUBE AND CAMERA

BACKGROUND OF THE INVENTION

This invention relates to electron optical image tubes and cameras for use in providing direct measurement of luminous events having short durations, and more particularly the invention is directed to a proximity focused shutter tube and camera.

Image tube streak cameras are well known in the art. Such cameras utilize an electron-optical image tube which is capable of providing direct measurement of luminous events having very short durations. The streak tube includes a photocathode which responds to incident light by emitting photo-electrons. The photoelectrons are directed to a phosphor coated screen which renders the photo-electron beam visible. A film carrier is provided in close proximity to the screen for recording the visible image.

U.S. Pat. No. 3,761,614 to Bradley discloses a streak camera in which the image tube utilizes an extraction mesh electrode to which is applied a voltage of rapid rise time thus forming an electric field in close proximity to the photoconductor which directs photoelectrons to a phosphor screen.

U.S. Pat. No. 3,777,210 to Einstein and U.S. Pat. No. 3,603,828 to Sheldon disclose amplification tubes for light and X-ray images which employ microchannel plate (MCP) devices for amplifying an image by accelerating photo electrons through the MCP device. The microchannel plate comprises a bundle of very small channels packed together parallel and forming essentially a thick layer of material with a very large number of passages or openings through the layer. By providing the MCP between the photocathode and the phosphor screen, and by applying voltages to the surfaces of the MCP facing the photocathode and the phosphor screen, respectively, an acceleration of electrons as well as a secondary emission of electrons within the MCP is accomplished.

Copending application Ser. No. 755,226, filed Dec. 29, 1976, now U.S. Pat. No. 4,120,002 (assigned to the present assignee) discloses a streak camera tube employing a passive MCP for collimating electrons from the photo cathode. Shuttering of the photo-electron stream is accomplished by applying a pulsed voltage to the photocathode which establishes a pulsed electric field between the photocathode and the front face of the MCP collimator. The electron optical image tube comprises a photocathode and a passive microchannel plate collimator arranged to convert an image of the target incident thereon to a collimated electron beam with deflection electrodes arranged to receive the collimated photoelectrons and subject them to an electric field to produce a streak record. Employment of the microchannel plate enables transverse photo-electron velocity selection and allows focusing by virtue of the proximity of a phosphor to the photocathode.

Other devices are known which depend on streaking or which depend upon the rise and duration of a shutter pulse for operation. However, the speed of an external deflection plate system is limited due to inability to derive sufficient sweep voltage in a picosecond time period.

SUMMARY OF THE INVENTION

An object of the present invention is an improved proximity focused camera.

Another object of the invention is a proximity focused image tube with an improved shutter.

Still another object of the invention is a shutter for an electron beam with picosecond resolution and without time skewing.

Another object of the invention is a photoelectron camera for developing multiple time related frames of an image.

Briefly, in accordance with the present invention a proximity focused camera includes a focusing lens, a proximity focused shutter tube including a photocathode for receiving a photon image from said focusing lens and generating a photo-electron beam which is received by a phosphor screen, and a film carrier positioned adjacent to the phosphor screen for recording an image thereon. The proximity focused shutter tube further includes an electron beam shutter comprising a plurality of microchannel plates which are stacked in an array with conductive electrodes between adjacent plates. By applying a ramp-voltage to alternate plates in the stacked array, an electric field is developed across each microchannel plate whereby a photo-electron beam can be deflected and obtain a momentary period of transmission. The camera can develop multiple frames of an image by including a plurality of focusing lens and proximity shutter tubes and applying voltage ramp pulses to the shutter electrodes of the proximity focused shutter tubes in a time ordered sequence to develop related multiple frames.

A feature of the invention is an electrode on each plate of the stacked array which is skewed with respect to the front face and back face of the plate whereby in-phase deflection of an electron beam passing through the microchannels is achieved.

The invention and objects and features thereof will be more fully understood from the following detailed description and appended claims when taken with the drawing.

DESCRIPTION OF THE PREFERRED EMBODIMENT

Figure 1:
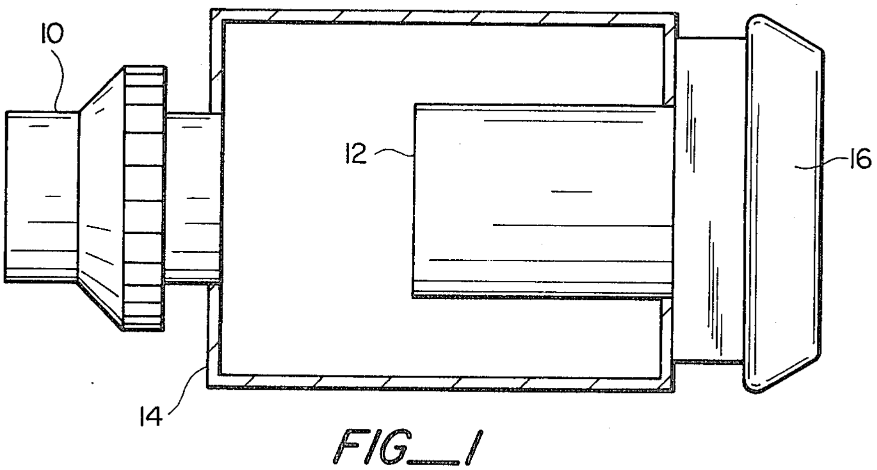
FIG. 1 is a side view partially in section of a camera using a proximity focused shutter tube in accordance with the present invention.

FIG. 1 is a side view partially in section illustrating a camera utilizing a proximity focused shutter tube in accordance with the present invention. The camera includes three principal assemblies within a housing including lens 10, a proximity focused shutter tube 12 supported within housing 14 (shown in section), and a film carrier portion 16 for recording images developed within the tube 12. Similar to the cameras described in copending application Ser. No. 834,561 and 755,226, supra, the lens 10 focuses an optical image onto a photocathode of the tube 12, and the photocathode responds to the focused image by generating photo-electrons. The photoelectrons are extracted from the photocathode by an electric field and directed to a phosphor coated screen within the tube which develops an optical image in response to the photo-electron beam. Film within the camera then records the optical image. The cameras are capable of providing direct measurement of picosecond pulses of radiant energy with a time resolution in the picosecond range.

Heretofore, gating of the photo-electron beam has been accomplished by means of a high voltage pulse applied to the photocathode which develops an electric field between the photocathode and a spaced electrode which extracts the photo-electrons and directs them towards the phosphor coated screen. Deflection plates are provided between the electrode and the phosphor coated screen to which a voltage pulse is applied to sweep the photo-electron beam across the phospor screen. While the streak camera provides picosecond resolution of X-rays or visible light, the camera will not provide an XY image of picosecond shutter durations.

Figure 2:
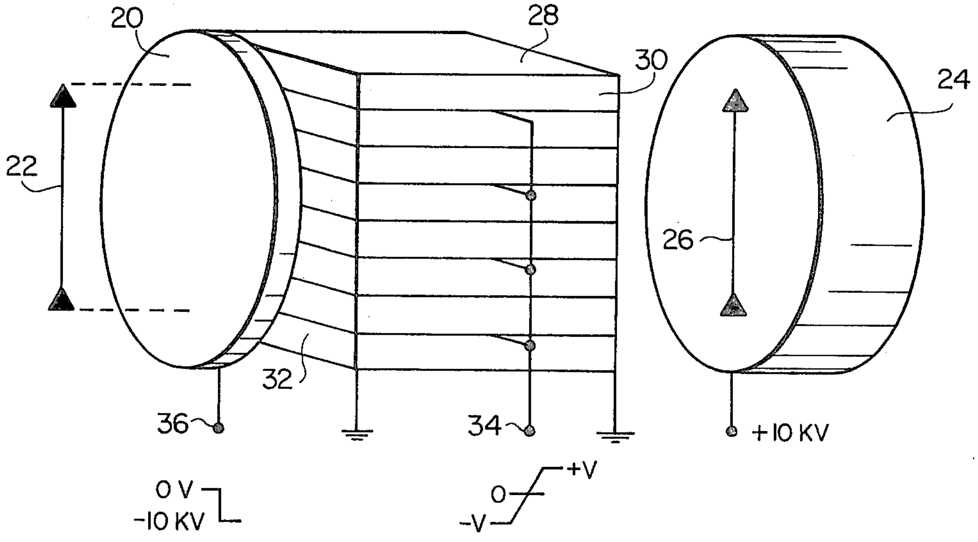
FIG. 2 is a perspective view illustrating a proximity focused shutter tube in accordance with the invention.

FIG. 2 is a perspective view of the proximity focused shutter tube in accordance with the present invention which provides picosecond framing and shuttering action with high ratio resolutions. As above described, a photocathode 20 receives an optical image 22 and in response thereto generates a pattern of photo-electrons. Spaced from the photocathode 20 is a phosphor coated screen 24 which responds to the photo-electrons and displays an optical image 26 to the object 22. It will be appreciated that the object 22 may be impinging light from a laser or other source which is directed to photocathode 20 by means of a lens. Further, it will be appreciated that a fiber optic input and output for the tube may be provided as such arrangements are known in the art.

Positioned between the photocathode 20 and phosphor screen 24 is a shutter 28 which comprises a plurality of stacked microchannel plates 30. As will be described further hereinbelow, the array of stacked microchannel plates has a front face 32 adjacent to the photocathode 20 and a back face which is adjacent to the phosphor screen. A plurality of microchannels run from the front face to the back face. The front face and the back face have electrodes plated thereon which are grounded. Between each plate of the stacked array is an electrode, and alternate electrodes of the stacked array are connected in parallel to a terminal 34. The other alternate electrodes of the array are connected to ground.

In operation, photo-electrons generated by the photocathode in response to incident optical photons are extracted from the photocathode and directed towards the phosphor display by the application of a minus 10 kv potential to terminal 36 which is connected to the face of the photocathode. The electric field developed between the face of photocathode 20 and the grounded electrode on the front face 32 of the shutter extracts the photo-electrons. In timed sequence with the application of the 10 kv potential to terminal 36, the voltage on terminal 34 is pulsed from a minus voltage potential to a plus voltage potential (e.g. +3.8 kv to −3.8 kv) and as the voltage pulse passes the zero voltage level electrons are allowed to traverse the microchannels of the array 28 and pass therethrough to the phosphor screen. At both the −V potential level and the +V potential level on electrode 34 the photo-electrons are directed to and captured by the walls of the microchannels. Thus, a frame duration or shutter interval can be achieved during the period of the ramp voltage. The actual duration of the frame may be adjusted to longer time intervals by varying the ramp of the shutter voltage applied to terminal 34. It will be appreciated that with the alternate connection of the shutter array electrodes, the electric field in each MCP plate actually reverses. However, the system is symmetric so gating is attained in the substructures regardless of whether photo-electrons for that segment are swept up or swept down in the microchannels.

Figure 3:
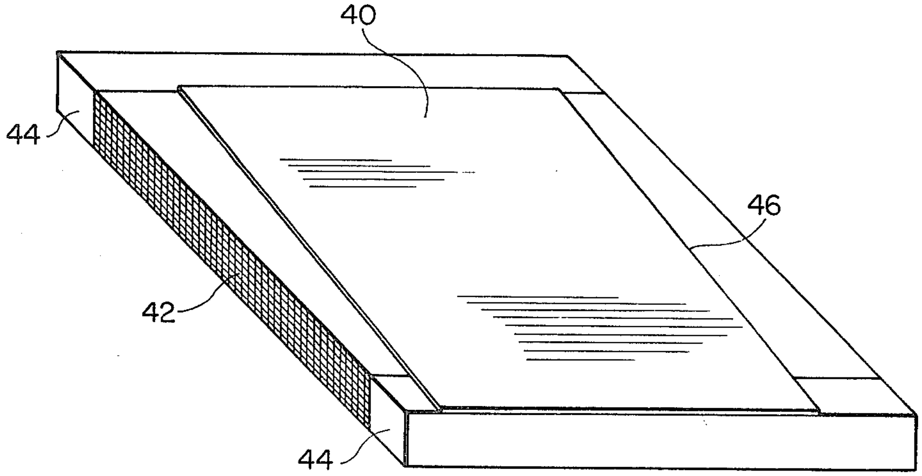
FIG. 3 is a perspective view of a microchannel plate employed in the shutter of the tube illustrated in FIG. 2.

FIG. 3 is a perspective view of one plate for use in the stacked array for the shutter 28 in FIG. 2. In a preferred embodiment the plate 40 has a front face 42 which is 1.5 millimeters in height and 14 millimeters in length. The front face 42 includes a central portion which is 12 centimeters in length and has microchannels defined therein. At either end of the front face is a solid glass portion 44 which may be one to two millimeters in length. The depth of the microchannel plate is 15 millimeters and 12 plates are stacked in the array thereby giving a total front face which is 12 millimeters square. Since each plate is only 1.5 millimeters thick, the resultant electrical field applied across the plate is over 10 times the field strength which could be obtained having only 2 plates outside the stacked array. The microchannels defined in the plate are 75 microns square. The electrodes on the front and back surfaces are plated with the plating extending into each microchannel. Suitable microchannel plate is commercially available from International Telephone and Telegraph Company, Roanoke, Va. Formed on the top surface 40 and the opposing bottom surface are electrodes 46 which are skewed with respect to the front and back faces, as will be further described in particular with reference to FIG. 4. The electrodes comprise suitable conductive material such as gold which is deposited to a thickness of approximately 100 angstroms.

Figure 4:
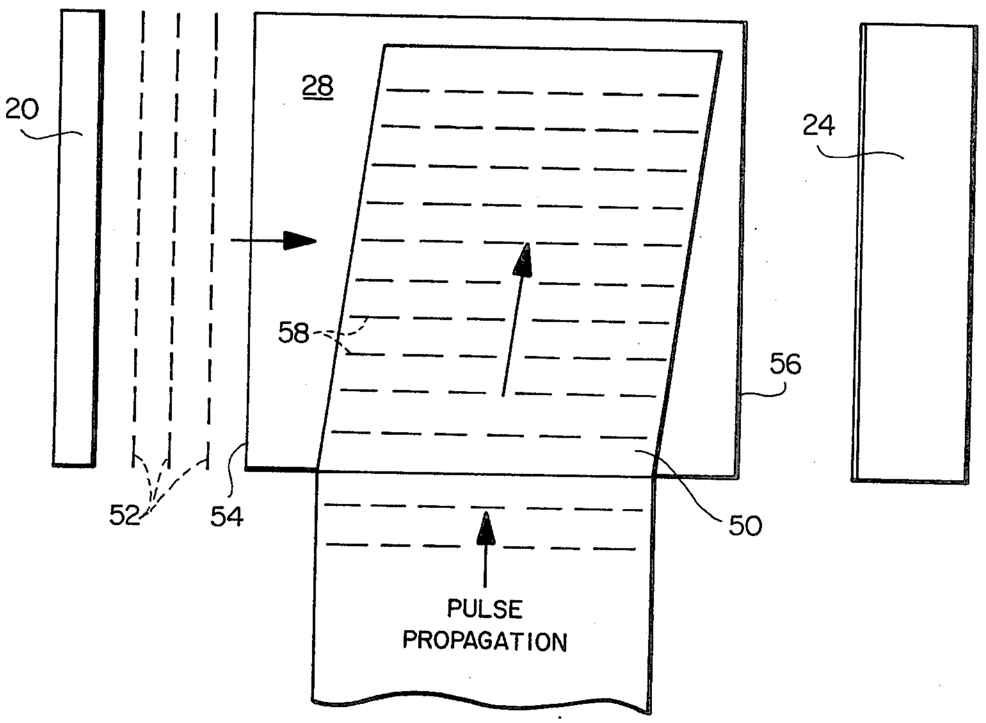
FIG. 4 is a top view of the tube shown in FIG. 2.

Referring now to FIG. 4, a feature of the invention is illustrated in a top view of the tube shown in FIG. 2. In view of the picosecond shutter speeds obtained with the camera and shutter in accordance with the present invention, it is important to maintain in-phase deflection of a photo-electron beam 52 which is extracted from photocathode 20 and passes through shutter 28. The lines 52 indicate in-phase waves of the electron beam. To maintain the in-phase deflection of the beam, the electrode 50 is skewed with respect to the front face 54 and back face 56 of the shutter array whereby the propagation of the shutter pulse shown generally by the lines 58 deflect the incoming photo-electron wave in-phase. In a small electron tube the shutter voltage pulse travels at the speed of light and will be generated approximately 40 picoseconds earlier on one side of the array 28 then on the other side. The amount of skewing of the plate 50 is determined by the dimensions of the array and the speed of the photo-electron beam which moves at about $10^7$ meters per second. Thus, the offset or skewing of the electrode 50 will be only a fraction of a millimeter. For the plate described in FIG. 3 with the microchannels aligned along 12 millimeters of the plate, the amount of offset or skewing of the electrode over this 12 millimeter width of the plate is only 0.4 millimeters.

Figure 5:
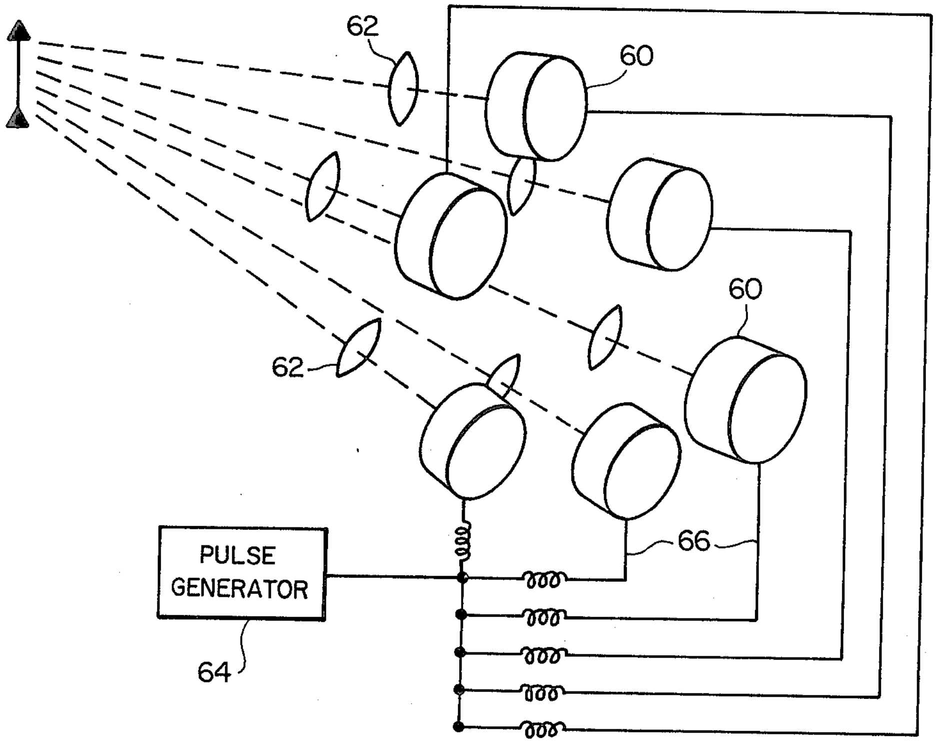
FIG. 5 is a perspective view functionally illustrating a camera in accordance with the present invention for developing multiple frames in a time ordered sequence.

Multiple frames are often desirable for a framing camera to be useful. In accordance with another embodiment of the invention the camera includes a multiple array of individual tubes as shown in FIG. 5. For illustration purposes the array includes six proximity focused shutter tubes 60 with each tube having an associated lens 62. The individual tubes are fed from a common pulse generator 64, and the desired time sequence of the frames developed by these several tubes is determined by varying the length of the transmission lines 66 from the pulse generator 64 to each of the tubes. By changing the transmission line lengths, frames can be made to overlap, be adjacent in time, or be spaced at prerequisite intervals. Since the distribution network from frame to frame in the sequential array is passive, interframe jitter is zero.

The proximity focused shutter tube in accordance with the present invention provides a frame duration or shutter interval less than 10 picoseconds. The duration of the frame may be adjusted by varying the ramp of the shutter voltage applied to the tube. Further, since the tube utilizes a proximity focused design, the shutter has enlarged dynamic range and will record a picture over a broad range of light levels. When operated with an X-ray sensitive photocathode such as gold or aluminum, the tube provides a record with similar temporal resolution of direct X-ray flux. As described, the camera can be operated in an array which is triggered from a common pulser whereby multiple time related frames are developed.

While the invention has been described with reference to specific embodiments, the description is illustrative of the invention and is not to be construed as limiting the invention. Various modifications, changes and applications may occur to those skilled in the art without departing from the true spirit and scope of the invention as defined by the appended claims.

What is claimed is:

1. A shutter for an electron-beam comprising a plurality of microchannel plates, each plate having first and second major surfaces, a front face, a back face, and a plurality of microchannels between said first and second major surfaces and extending from said front face to said back face in parallel axial alignment, at least one major surface of each plate having an electrode thereon, said plurality of microchannel plates being stacked in an array with at least one of said electrodes between adjacent plates, and conductor means for applying a voltage to electrodes on said plates whereby an electrical field can be established between said major surfaces of each plate.

2. A shutter as defined by claim 1 wherein said electrode on said major face is skewed with respect to said front face and said back face.

3. A shutter as defined by claim 2 wherein said front face and said back face have electrodes thereon.

4. A shutter as defined by claim 1 and including an electrode on each of said major faces of each plate.

5. A shutter as defined by claim 4 wherein said electrodes on said major faces are skewed with respect to said front face and said back face whereby deflection of an electron beam passing through said microchannels is in-phase.

6. A shutter as defined by claim 5 wherein said front face and said back face have electrodes thereon.

7. A shutter as defined by claim 6 wherein one electrode on a major surface of each plate is electrically interconnected with said front face electrode and said back face electrode.

8. A proximity focused shutter tube comprising a photocathode for receiving short duration photon images and converting said photon images to photo-electrons, a phosphor screen for receiving said photo-electrons, and a shutter for said photo-electrons positioned between said photocathode and said phosphor screen, said shutter including a plurality of microchannel plates, each plate having a front face adjacent to said photocathode, a back face adjacent to said phosphor screen, first and second major surfaces, and a plurality of microchannels between said first and second major surfaces and extending from said front face to said back face in parallel axial alignment, at least one major surface of each plate having an electrode thereon, said plurality of microchannel plates being stacked in an array with at least one of said electrodes between adjacent plates, and conductor means for applying a voltage to said plates whereby electrical fields can be established between major surfaces of each plate.

9. A proximity focused shutter tube as defined by claim 8 wherein each microchannel plate of said shutter includes an electrode on each of said major faces.

10. A proximity focused shutter tube as defined by claim 9 wherein said front face and said back face have electrodes thereon.

11. A proximity focused shutter tube as defined by claim 10 wherein one electrode on a major surface of each plate is electrically interconnected with said front face electrode and said back face electrode.

12. A proximity focused shutter tube as defined by claim 11 wherein said electrodes on said major faces are skewed with respect to said front face and said back face whereby deflection of electron beam passing through said microchannel is in-phase.

13. A proximity focused shutter tube as defined by claim 8 wherein said electrode on at least one major surface of each plate is skewed with respect to said front face and said back face.

14. A camera comprising:

a focusing lens, a proximity focused shutter tube including a photocathode for receiving a photon image from said focusing lens and converting said images to photoelectrons, a phosphor screen for receiving said photo-electrons, and a shutter for said photo-electrons positioned between said photocathode and said phosphor screen, said shutter comprising a plurality of microchannel plates, each plate having a front face adjacent to said photocathode, a back face adjacent to said phosphor screen, first and second major surfaces, and a plurality of microchannels between said first and second major surfaces and extending from said front face to said back face in parallel axial alignment, at least one major surface of each plate having an electrode thereon, said plurality of microchannel plates being stacked in array with at least one of said electrodes between adjacent plates, conductor means for applying a voltage to said plates whereby electrical fields can be established between the major surfaces of each plate, and a film carrier positioned adjacent to said phosphor screen for recording an image on said phosphor screen.

15. A camera as defined by claim 13 for developing multiple frames which further includes at least one additional lens, a second proximity focused shutter tube in association with said additional lens, and a film carrier in association with said second proximity focused shutter tube for recording an image developed thereby, and means for applying a voltage pulse to said proximity focused shutter tubes, said voltage pulse being applied in a time ordered sequence to develop related multiple frames.

* * * * *